United States Patent [19]

Mohan

[11] Patent Number: 4,699,288
[45] Date of Patent: Oct. 13, 1987

[54] HIGH PRESSURE VESSEL CONSTRUCTION

[75] Inventor: Raja Mohan, Salt Lake City, Utah

[73] Assignee: Edo Corporation/Fiber Science Division, Salt Lake City, Utah

[21] Appl. No.: 856,378

[22] Filed: Apr. 28, 1986

[51] Int. Cl.⁴ .......................... B65D 1/16; F16J 12/00
[52] U.S. Cl. ......................................... 220/3; 220/71; 220/83; 220/414
[58] Field of Search ................. 220/3, 71, 72, 83, 414

[56] References Cited

U.S. PATENT DOCUMENTS

| | | | |
|---|---|---|---|
| 3,047,191 | 7/1962 | Young | 220/83 |
| 3,207,352 | 9/1965 | Reinhart | 220/83 |
| 3,240,644 | 3/1966 | Wolff | 220/83 |
| 3,303,079 | 2/1967 | Carter | 220/3 |
| 3,866,792 | 2/1975 | Minke | 220/72 |
| 3,969,812 | 7/1976 | Beck | 220/3 |
| 4,053,081 | 11/1977 | Minke | 220/3 |

Primary Examiner—George E. Lowrance
Attorney, Agent, or Firm—Thorpe, North & Western

[57] ABSTRACT

A high pressure vessel construction in the form of an elongate tank includes a plurality of layers of resin impregnated graphite fibers and a plurality of layers of a hybrid of resin impregnated glass and polymer fibers, with the glass and polymer fiber layers alternating with the graphite fiber layers. The outermost layers are hoop wound and the innermost layers are helically wound. A layer of elastomer material is joined to the interior surface of the innermost layer of fibers, and a layer of stiff composite material is joined to the interior surface of the elastomer layer.

18 Claims, 1 Drawing Figure

U.S. Patent  Oct. 13, 1987  4,699,288
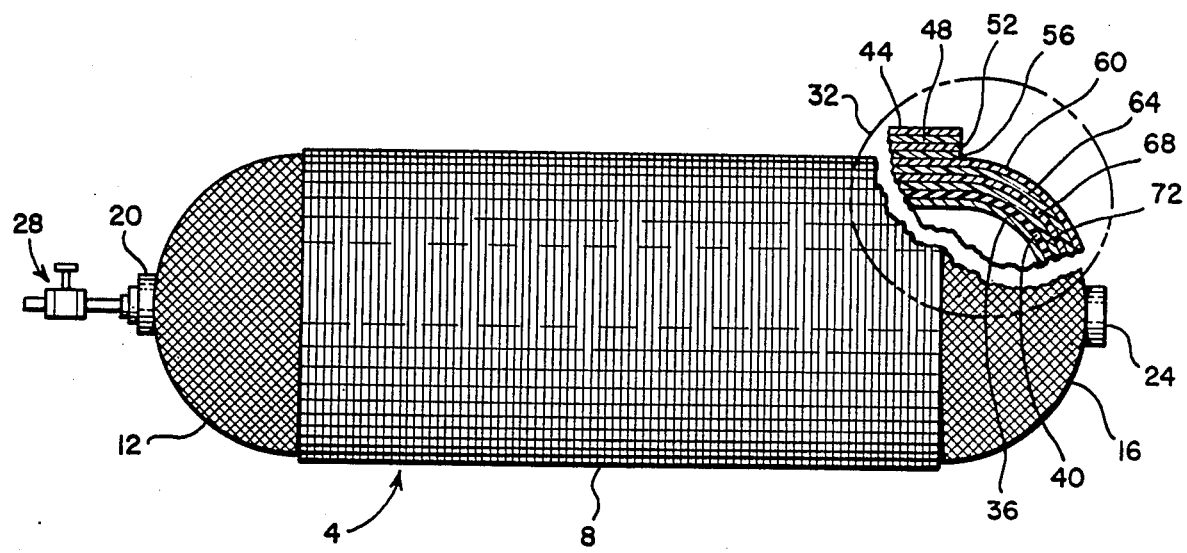

HIGH PRESSURE VESSEL CONSTRUCTION

BACKGROUND OF THE INVENTION

The present invention relates to composite high pressure vessel construction especially adapted to resist fragmenation when struck by a bullet or other missile, or when subjected to other type failures.

Composite high pressure vessels and methods of manufacture thereof are well known in the prior art. Exemplary applications or uses of high pressure vessels or containers include scuba tanks, fuel tanks for aircraft and land vehicles, chemical holding tanks for holding a variety of corrosive and/or volatile chemicals, and tanks for holding gases under pressure. An exemplary method of manufacturing large high pressure composite vessels is discussed in copending patent application, Ser. No. 769,018, filed Aug. 26, 1985.

When composite high pressure vessels are utilized in military or combat situations, it is especially important that the vessel be as impact and failure resistant as possible. In particular, it is desirable that vessels or containers used in such environments be resistant to explosion or significant fragmentation when struck by bullets or other missiles. High pressure vessels made of glass fibers, reinforced with epoxy or similar resin, have been proposed and used, and found to have fragmentation resistant properties. However, such high pressure vessels must be made quite thick to exhibit the desired properties and consequently the vessels have a very high weight to volume ratio. High pressure vessels made of graphite fibers are brittle and fragment rather easily unless the thickness is increased to the point where the weight to volume ratio, again, is very high and the cost is high.

SUMMARY OF THE INVENTION

It is an object of the invention to provide a high pressure vessel construction which is resistant to fragmentation, light in weight and relatively inexpensive to manufacture.

It is another object of the invention to provide such a vessel construction which has a high fatigue strength and low susceptibility to creep rupture.

It is a further object of the invention to provide such a vessel constuction which is substantially fire resistant.

The above and other objects of the invention are realized in a specific illustrative embodiment of a high pressure vessel construction which includes layers of high modulus, high strength fibers, such as graphite, wound to form an enclosure. These layers alternate with other layers composed of a combination of two types of low modulus, high strength fibers, such as glass and a polymer, also wound to form the enclosure. The first mentioned layers are provided as the primary load carriers for the vessel, to provide structural strength, whereas the second mentioned layers are provided to absorb fracture energy from the first mentioned layers and prevent fragmentation of the vessel generally when it is struck by bullets or other missiles. In particular, when the vessel wall is struck by a high velocity object, the wall is damaged and shock waves are produced in the wall layers. The resulting failure in the low modulus, high strength combination fiber layers serves to absorb stain energy and thereby reduce fragmentation in the high modulus, high strength fiber layers.

In accordance with one aspect of the invention, the outermost layers of fibers are hoop wound and the innermost layers are helically wound. This provides increased strength to the vessel.

In accordance with another aspect of the invention, the vessel construction includes a layer of elastomer material joined to the interior surface of the innermost layer of fibers, and also a layer of rigid composite material joined to the interior surface of the elastomer material. The elastomer material is provided to prevent leakage of gases contained in the vessel, and the stiff composite material reduces the tendancy for the elastomer material to bulge inwardly as a result of high pressure leaked gases in the fiber layers expanding against the elastomer material.

BRIEF DESCRIPTION OF THE DRAWING

The above mentioned objects, features and advantages of the invention will become apparent from a consideration of the following detailed description presented in connection with the drawing which shows a side elevational, partially cut-away and cross sectional view of a high pressure vessel made in accordance with the principles of the present invention.

DETAILED DESCRIPTION

Currently available composite high pressure vessels, as indicated earlier, suffer from fragmentation and rupture problems as a result of being struck by high velocity objects. The common solution for overcoming the problems is simply to increase the thickness of the vessels to a point where the weight to volume ratio is increased significantly, with an attendent increase in materials and manufacturing costs. The high pressure vessel construction of the present invention overcomes these problems by employing a combination of fiber windings arranged to provide high structural stength and reduce fragmentation, while maintaining a relatively light weight.

Referring to the drawing, there is shown a vessel or container 4 constructed in accordance with the present invention. The vessel 4 is formed of several layers of composite fiber windings into an elongate enclosure having a generally hollow cylindrical center section 8 and two generally hollow spherical end sections 12 and 16. This is a conventional shape for a composite fiber wound tank or vessel. See, for example, the aforecited copending application, Ser. No. 769,018.

The winding of the fibers takes place utilizing conventional winding machinery and equipment, typically including a mandrel configured to accept polar rings at each end thereof so the mandrel may be mounted on support pins for rotational movement in a winding machine. The winding machine will include a mechanism for causing the mandrel to rotate about its polar axis. The winding operation is generally preceded by coating the mandrel with an appropriate mold release substance to prevent adherance to the mandrel of layers subsequently placed thereover. Oftentimes, the mandrel will then be coated with a layer which will act as an internal protective coating to keep caustic fluids and gases from reaching other layers of the vessel, such coating generally being referred to as a liner. The liner, of course, would be selected to be impervious to such caustic fluids and gases contained in the vessel. Thereafter, winding of the vessel is commenced utilizing one or more strands or rovings of high strength filament, starting at one polar ring, winding along the mandrel to the other polar ring.

The vessel 4 shown in the drawing could be constructed using a variety of the presently available fabrication processes including that just described. The vessel of the drawing is a completed vessel including end pieces or plugs 20 and 24 placed over openings which remain after the winding has been completed. The end pieces 20 and 24 seal off the vessel to prevent access or escape of fluid from the interior except through a valve mechanism 28 coupled to the end piece 20.

A portion of the vessel 4 is shown magnified and exaggerated at 32 to illustrate the various layers of the vessel walls. An innermost layer 36 of the vessel is constructed of a stiff composite material utilizing a high strength filament or fiber such as graphite, with the composite material being impregnated with resin. The second layer 40 is an elastomer material, such as nitrile rubber, provided as a liner to prevent leakage of gas which may be carried in the vessel. The elastomer layer 40, which is bonded to the third layer 72 is flexible, resilient and impermeable and thus serves to reduce the liklihood of gas leaks. Still, some gas from the interior of the vessel may diffuse through the liner into voids found in the outer layers and then when the vessel is rapidly depressurized, the back pressure would normally cause the elastomer material 40 to bulge inwardly. However, the presence of the stiff, rigid composite material 36, which is bonded by adhesive or other bonding mechanism to the elastomer layer 40, prevents such bulging from taking place.

The outer eight layers of material shown in the magnified section 32 are composed of alternate layers of high modulus, high strength fibers such as graphite or aramid, and a combination or hybrid of two types of low modulus, high strength fibers. Advantageously, the low modulus fibers are about one-third the modulus of the high modulus fibers. The fibers are resin impregnated, as earlier described. The low modulus, high strength layers of fibers advantageously are constructed of an intra-ply (e.g., two type fibers used in a single layer) hybrid of, for example, glass and a polymer such as low modulus aramid, polyethylene or other polymer having high tensile strength and low compressive strength. The glass and polymer fibers are wound to form the desired layer. Layers 44, 52, 60 and 68 are the low modulus, high strength fibers, whereas layers 48, 56, 64 and 72 are the high modulus, high strength fibers.

The layers of high modulus, high strength fibers, by virtue of their high modulus, are the primary load carrying layers, providing the structural strength to allow for the high pressure containment of fluids in the vessel. The layers of low modulus, high strength hybrid are provided to absorb the fracture energy of the high modulus, high strength layers to thus prevent fragmentation. The low modulus, high strength polymer fibers have low compression strength which results in a larger area of failure (spreads out) in the low modulus, high strength layers upon impact of the vessel by a high velocity object (the larger area of failure appears to be from compression shock in the polymer fiber layers). If a hole is made in the vessel, the region surrounding the hole is subjected to high stress concentrations because the fluid in the vessel which is under pressure takes some time to escape. As a result fractures begin to propagate at high speed from the hole, and the combination of failure already induced in the low modulus, high strength fibers and the propagating fractures help to inhibit the cracks and absorb strain energy. The ultimate result is that significant fragmentation of the vessel is prevented and explosion of the vessel is avoided. This result is achieved with a thinner walled vessel and thus a lighter weight vessel than would be required using conventional construction.

The four inner layers of fibers 60, 64, 68 and 72 are helically wound at, for example, an angle of 12 to 45 degrees with respect to a meridian on the cylinder to form the end sections 12 and 16 and a portion of the center section 8. The four outer layers 44, 48, 52 and 56 are hoop wound to form the remaining portion of the center section. All the layers are bonded together by the resin in the fibers. This construction provides an exceptionally high strength, lightweight and fragmentation resistant vessel or container suitable for carrying fluids under high pressure.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A high pressure vessel construction comprising
   an inner layer of resin impregnated graphite fibers wound to form an enclosure, and
   an outer layer hybrid of resin impregnated glass and polymer fibers wound about the inner layer and adhered thereto.

2. A vessel construction as in claim 1 further comprising one or more additional wound layers of resin impregnated graphite fibers, and one or more additional wound layers of resin-impregnated glass and polymer fibers, with the glass and polymer fiber layers alternating with the graphite fiber layers.

3. A vessel construction as in claim 2 wherein the innermost layer of graphite fibers is helically wound, and wherein the outermost layer of glass and polymer fibers is hoop wound.

4. A vessel construction as in claim 3 wherein there are four layers of graphite fibers, the two outermost being hoop wound and the two innermost being helically wound, and wherein there are four layers of glass and polymer fibers, the two outermost being hoop wound and the two innermost being helically wound.

5. A vessel construction as in claim 2 further comprising a layer of elastomer material adhered to the interior surface of the innermost layer of glass and polymer fibers, and a layer of stiff composite material adhered to the interior surface of the elastomer layer.

6. A vessel construction as in claim 5 wherein the elastomer material is rubber and the stiff composite material is graphite reinforced composite material.

7. A vessel construction as in claim 1 wherein the polymer fiber is selected to have high tensile strength and low compressive strength.

8. A high pressure tank comprising
   a first layer of high modulus, high strength fibers wound to form an enclosure having a generally circular cross-section, and
   a second layer of low modulus, high strength intra-ply combination of two types of fibers wound about and joined to the first layer.

9. A tank as in claim 8 further comprising additional layers wound of high modulus, high strength fibers joined to and alternating with additional layers wound of low modulus, high strength combinations of said two types of fibers.

10. A tank as in claim 9 wherein said high modulus, high strength fiber is selected from the group consisting of graphite and aramid fibers.

11. A tank as in claim 10 wherein said low modulus, high strength fiber combination is glass and polymer fibers wound together.

12. A tank as in claim 11 wherein the polymer fiber is selected to have high tensile strength and low compressive strength.

13. A tank as in claim 9 wherein a layer of high modulus, high strength fibers is the innermost layer and is helically wound, and wherein a layer of low modulus, high strength fibers is the outermost layer and is hoop wound.

14. A tank as in claim 13 further comprising a layer of elastomer material joined to the interior surface of the innermost layer of fibers, and a layer of stiff composite material joined to the interior surface of the elastomer layer.

15. A tank as in claim 14 wherein the elastomer material is selected to have low permeability and wherein the stiff composite material is a graphite reinforced composite material.

16. A tank as in claim 13 wherein the tank is generally elongate, having a hollow cylindrical center section, and hollow spherical end sections.

17. A tank as in claim 16 wherein at least the two innermost layers are wound to form the end sections and a portion of the center section, and wherein at least the two outermost layers are wound to form a portion of the center section.

18. A tank as in claim 9 wherein the modulus of the low modulus, high strength fibers is about one-third the modulus of high modulus, high strength fibers.

* * * * *